United States Patent [19]

Enderle et al.

[11] Patent Number: 5,740,776

[45] Date of Patent: Apr. 21, 1998

[54] METHOD OF OPERATING AN INTERNAL COMBUSTION ENGINE

[75] Inventors: Christian Enderle, Baltmannsweiler; Stephan Krämer, Leutenbach; Stephan Pischinger, Waiblingen; Klaus Rössler, Esslingen, all of Germany

[73] Assignee: Daimler-Benz AG, Stuttgart, Germany

[21] Appl. No.: 785,033

[22] Filed: Jan. 17, 1997

[30] Foreign Application Priority Data

Jan. 20, 1996 [DE] Germany .................. 196 02 065.4

[51] Int. Cl.[6] ...................................... F02B 3/04
[52] U.S. Cl. ........................................... 123/299
[58] Field of Search ........................ 123/299, 300

[56] References Cited

U.S. PATENT DOCUMENTS

| 4,621,599 | 11/1986 | Igashira et al. ............... 123/300 |
| 4,836,161 | 6/1989 | Abthoff et al. ............... 123/299 |
| 5,078,107 | 1/1992 | Morikawa ..................... 123/299 |
| 5,609,131 | 3/1997 | Gray, Jr. et al. ............. 123/299 |

FOREIGN PATENT DOCUMENTS

| 0 661 432 | 7/1995 | European Pat. Off. |
| 2 669 377 | 5/1992 | France . |
| 570 545 | 12/1972 | Switzerland . |

*Primary Examiner*—Willis R. Wolfe
*Assistant Examiner*—Hieu T. Vo
*Attorney, Agent, or Firm*—Klaus J. Bach

[57] ABSTRACT

In a method of operating an internal combustion engine with direct injection of fuel into an engine combustion chamber during a compression stroke of a respective piston wherein first a main fuel volume is injected and subsequently an ignition fuel volume is injected into the combustion chamber, the injection of the main fuel volume is initiated only after about 3/10 of the compression stroke of the piston has been completed.

5 Claims, 1 Drawing Sheet

METHOD OF OPERATING AN INTERNAL COMBUSTION ENGINE

BACKGROUND OF THE INVENTION

The invention relates to a method for the operation of an internal combustion engine wherein a main fuel amount is injected directly into a cylinder during a compression stroke and subsequently an ignition fuel amount is injected directly into the combustion chamber.

Such a method is disclosed in patent CH 57 05 45 as an alternative to the injection of a main fuel amount into the suction duct. In this method, the main fuel amount is injected intermittently at certain points at the beginning of the compression stroke.

It is known that variations in the duration and the point of time of the ignition phase of combustion processes in engine combustion chambers influence the location of the subsequent conversion phase and consequently, the combustion in, and the operational smoothness of, the engine. The state of the fuel/air mixture with regard to fuel concentration and the movement of the mixture in the area of the spark plug at the time of ignition have an important influence on the combustion in engines with external ignition initiation such as four cycle internal combustion engines with direct fuel injection into an undivided combustion chamber.

It is the object of the present invention to provide a method for the operation of an internal combustion engine wherein a main fuel volume is injected into an engine cylinder during a compression stroke and a further fuel volume is then injected into the combustion chamber such that a good fuel/air mixture in the combustion chamber is obtained which provides for good and smooth combustion.

SUMMARY OF THE INVENTION

In a method of operating an internal combustion engine with direct injection of fuel into an engine combustion chamber during a compression stroke of a resective piston wherein first a main fuel volume is injected and subsequently an ignition fuel volume is injected into the combustion chamber, the injection of the main fuel volume is initiated only after about 3/10 of the compression stroke of the piston has been completed.

By dividing the full volume of fuel to be injected into a main fuel volume and the later injected ignition fuel volume, an advantageous air/mixture is obtained which results in the desired stable combustion, both volumes being injected during the compression stroke at different points in time. As a result, there are two fuel charge clouds of different compositions present in the combustion chamber at the time of ignition. The injection of the main fuel volume occurs at a point of time ahead of the injection of the ignition volume of fuel wherein the injection point of time for the main fuel volume is so selected that the fuel/air mixture is as good as possible without exceeding the time limit for ignition.

It has been found that it is particularly important that the injection beginning for the main fuel volume is not already at the beginning of the compression stroke but only later, that is, more accurately, after completion of about 3/10 of the total compression stroke. In this way, optimal conditions, that is, an essentially stoichiometric fuel/air mixture with high flow speed is being generated in the area of the spark plug at the time of ignition. The relatively late injection of the main fuel volume during the compression stroke and the subsequent injection of the ignition fuel volume provide for a mixture stratification wherein, in every load and speed range of the engine, the main fuel volume layer is adjacent the layer of the ignition fuel volume or they are overlapping. By appropriate adjustment of volumes and timing of the ignition fuel volume injection and of the fuel ignition immediately after or, preferably, during the injection of the ignition fuel, a safe combustion of the mixture over the whole load and speed range of the engine can be achieved.

In one embodiment of the invention, the beginning of injection for the main fuel volume is retarded when the engine load falls so that over the whole engine load and speed range an essentially stoichiometric fuel/air mixture is present at the spark plug at the time of ignition. In this process it is taken into consideration that the distribution of the charge stratification and its mixture composition change dependent on the load and the speed of the engine.

In one embodiment, the fuel volume is injected only relatively shortly before the end of the compression stroke that is, not before 7/9 of the compression stroke is completed. The injection beginning for the ignition fuel volume is generally chosen not dependent on engine load.

The ignition fuel volume may also be injected already relatively shortly after the end of injection of the main fuel injection volume, that is, at a point of time which is less than 1/10 of the total compression stroke behind the completion of the injection of the main fuel injection volume.

It has been found that it is advantageous to ignite the fuel/air mixture during, or shortly after, the injection of the ignition fuel volume.

A preferred embodiment of the invention will be described below on the basis of the accompanying drawings.

DESCRIPTION OF A PREFERRED EMBODIMENT

Figure 1:
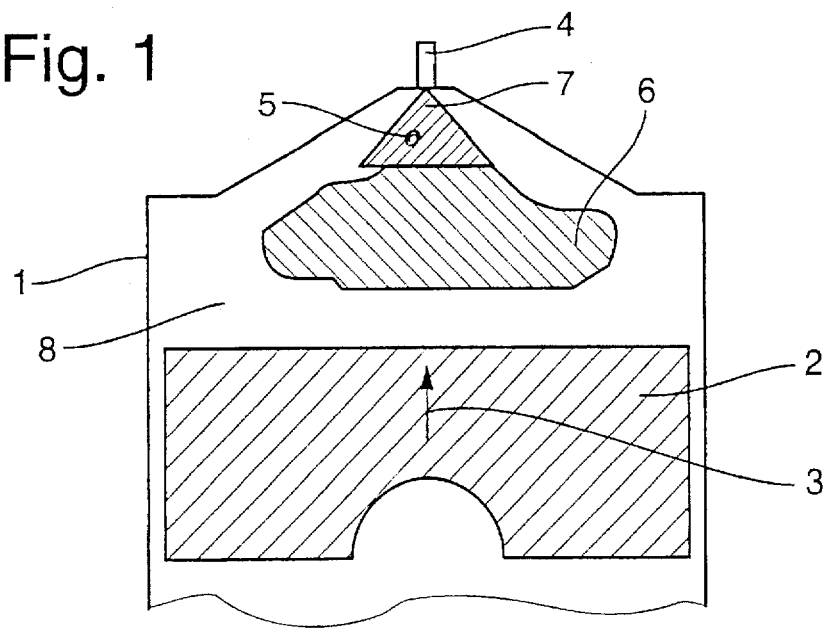
FIG. 1 is a schematic cross-sectional view of the upper part of a piston cylinder unit of a four cycle gasoline engine and, FIG. 2 shows a diagram illustrating the injection process for the main and the ignition fuel volumes depending on engine load.

FIG. 1 shows schematically the upper part of a piston-cylinder unit of a four cycle gasoline engine with direct fuel injection into an unseparated combustion chamber. The piston-cylinder unit comprises, as usual, a piston 2 which is axially movably disposed in a cylinder 1, the direction of axial movement of the piston during a compression stroke being indicated by an arrow 3. At the upper end of the cylinder 1, a fuel injection nozzle 4 is disposed in the center of the cylinder by way of which the fuel to be burnt in the non-separated combustion chamber is injected directly into the combustion chamber. In this way, the engine can be operated without throttling air admission to the cylinders, that is, the engine is controlled by controlling the amount of fuel injected into the cylinder. The fuel injection is initiated always only clearly after the start of a particular compression stroke in such a way that, first, a larger main fuel injection volume and subsequently a smaller ignition fuel volume are injected. By the exclusive injection of fuel during the compression stroke, a charge stratification of the injected fuel is achieved. The stratification is such that from the first injected main fuel volume, a relatively expansive schematically shown main volume mixture cloud 6 is formed whereas from the later injected ignition fuel volume a smaller volume ignition fuel mixture cloud 7 is formed.

The injection process is so controlled that, at the time of ignition, the two mixture clouds overlap or are at least disposed adjacent one another. The injected fuel is ignited by a spark plug 5 whose position in the combustion chamber 8 is indicated schematically by a small circle. The fuel injection is so controlled as to insure that, at the time of ignition, there is a stoichiometric or at least almost stoichiometric fuel/air mixture in the area around the spark plug. Since the location, the propagation and the composition of the stratification of the main fuel volume injected during the compression stroke change in dependence on engine load and engine speed, the momentary engine load and engine speed are taken into consideration for the control of the fuel injection process.

Below the control of the fuel injection process is described in greater detail wherein as measure for the time T during an injection process, the crank shaft position for the piston 2 is determined in degrees of crankshaft angle (°KW) before the upper dead center position. A compression stroke consequently lasts from 180° KW to 0° KW. On the base of the diagram shown in FIG. 2, the engine load (L) is given in percent of full load (VL). The range of possible time periods for the injection of the main fuel volume in advanced time direction is given by the lower limit line (Hu) and in the retarded time direction, it is given by the upper limit line (Ho). As apparent from FIG. 2, the lower limit line (Hu) falls with increasing engine load, that is, with falling engine load, the earliest possible injection beginning for the main fuel amount is moved toward later injection. It is also apparent that, even at high engine loads, the injection beginning is always at crankshaft angles of less than 125° before top dead center, that is, only at a point of time at which the piston 2 has already completed 3/10 of the compression stroke. During load-free operation of the engine, the earliest possible injection beginning for the main injection fuel volume is only at slightly more than 60° KW before the upper dead center position of the piston.

With the engine load dependent selection of the injection beginning for the main fuel volume, an as stoichiometric as possible fuel/air mixture is present as a stratified charge in a high-speed flow state in the area of the spark plug at the time of ignition independently of the respective momentary engine load and engine speed. Of course, while the best possible mixture preparation is provided, the ignition limits are not transgressed. It is further made sure that the stratification area of the injected main fuel volume is disposed at every engine load and engine speed at least adjacent the subsequently injected ignition fuel volume cloud. The upper limit line (Ho) which defines the latest possible termination for the injection of the main fuel volume is independent of engine load and is at about 9° KW before the upper dead center position.

Figure 2:
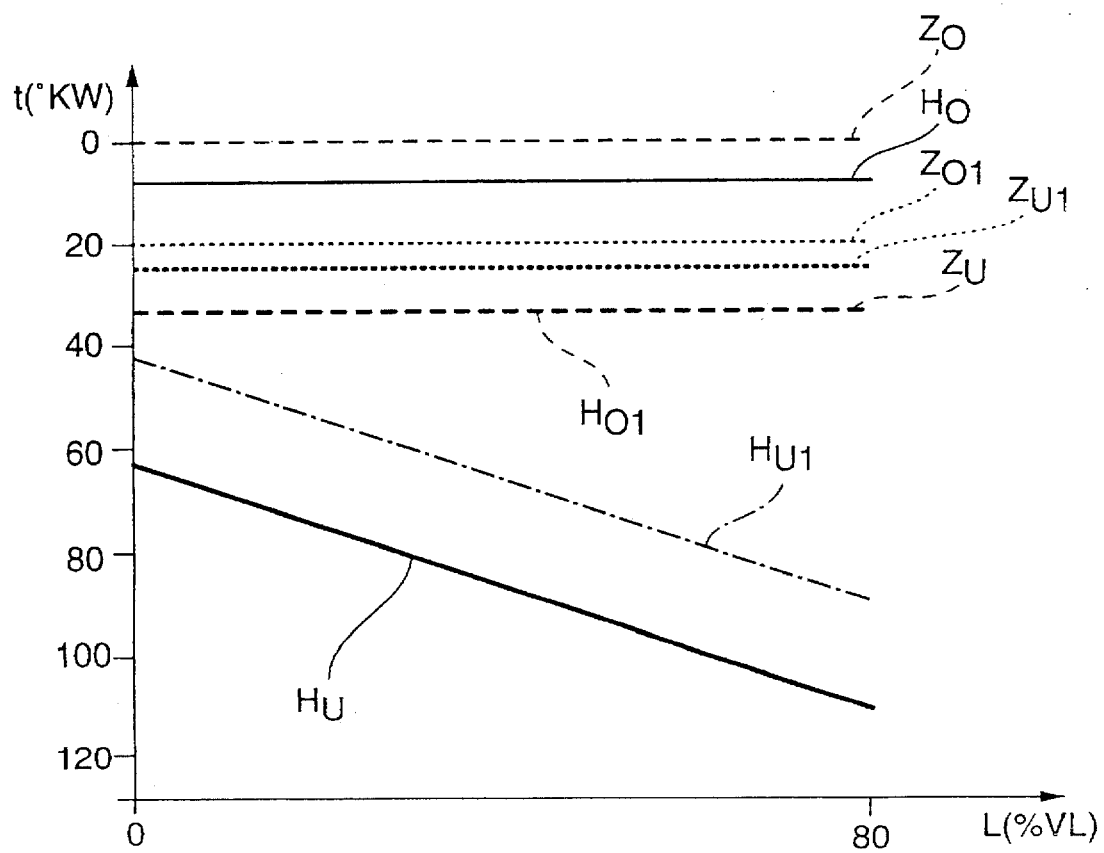

In an analog manner, the diagram of FIG. 2 indicates the possible time range for the injection of the ignition fuel volume between a lower limit line (Zu) and an upper limit line (Zo) which are both represented as dashed lines. Both lines (Zu, Zo) extend horizontally and are therefore load independent. The lower limit line (Zu) which represents the earliest possible ignition fuel amount injection beginning is at about 34° KW before top dead center and the upper limit line (Zo) which represents the latest possible termination point of time for the injection of the ignition fuel volume is shortly before the upper dead center position. This means that the injection beginning for the ignition fuel volume is not before completion of 7/9 of the total compression stroke.

Within the two respective time ranges, the main fuel injection volume and the ignition fuel injection volume are adjusted to the circumstances that is, for the given circumstances, the most suitable injection times are selected. In an example illustrated in FIG. 2, the begin of the injection of the main fuel injection volume is determined by the dash-dotted injection beginning line $Hu_1$ which descends linearly and extends parallel above the respective lower limit line Hu. In this case, the injection beginning with load-free engine operation is slightly over 40° KW and, with an engine load L of 80% of full load VL, it is at about 90° KW before top dead center. The end of the injection of the main fuel volume is determined by a horizontal line $Ho_1$ which, in this case, is identical with the lower limit line Zu for the injection of the ignition fuel volume and which is located accordingly at about 34° KW before top dead center. The beginning of the subsequent injection of the ignition fuel volume is marked by a horizontally extending dotted injection beginning line $Zu_1$ which is located at slightly over 25° KW. This provides for a delay between the end of injection of the main fuel volume and the beginning of injection of the ignition fuel volume of about 1/20 of the total compression stroke. The end of the injection of the ignition fuel volume is in this example at about 20° before the top dead center position as it is indicated by the respective dotted line $Zo_1$. Ignition of the injected fuel is achieved by way of the spark plug 5 during injection of the ignition fuel volume or shortly thereafter. From the example of an actual fuel injection control system as described above, it can be seen that the injection of the ignition fuel volume occurs shortly after termination of the injection of the main fuel volume which is generally advantageous also for injection procedures which are modified from the given example in other ways. The main fuel volume can be injected within the time frame selected depending on engine load in a continuous fashion or, alternatively, in an intermittent fashion by several injection pulses.

It should be apparent that the invention is not limited to the actual example of a controlled injection procedure as presented herein, but that the injection of the main fuel volume and the injection of the ignition fuel volume which is time delayed with respect to the injection of the main fuel volume can be varied within the frame of the limit curves (Hu, Ho, Zu, Zo) given in FIG. 2 such that an at least approximately stoichiometric fuel/air mixture in a high-speed flow state is provided in an optimal manner which can be reliably ignited by the spark of a spark plug. Also, of course, the invention is not limited only to piston engines but may also be used with other types of engines such as rotating piston engines wherein of course the measurement unit base of °KW is to be converted appropriately.

What is claimed is:

1. A method of operating an internal combustion engine with direct fuel injection into an engine combustion chamber, said method comprising the step of injecting into said combustion chamber during a compression stroke of a respective piston first, after completion of about 3/10 of the compression stroke of the engine piston over the full load range, a main fuel volume generating a main fuel cloud in said combustion chamber and subsequently an ignition fuel volume, which generates in said combustion chamber in the area around the spark plug an ignition fuel cloud providing an essentially stoichiometric fuel/air mixture and igniting said ignition fuel cloud which, upon combustion ignites the main fuel cloud.

2. A method according to claim 1, wherein the beginning of the injection of the main fuel volume is selected on an engine-load dependent basis in such a way that with falling engine load the injection of the main fuel volume is retarded and a mixture zone with an essentially stoichiometric fuel/air ratio is always formed.

3. A method according to claim 1, wherein the injection of the ignition fuel volume is initiated not until after about 7/9 of the compression stroke of the piston has been completed.

4. A method according to claim 1, wherein there is a gap between the end of the injection of the main fuel volume and the beginning of injection of the ignition fuel volume which is about 1/10 of the total compression stroke.

5. A method according to claim 1, wherein the fuel/air mixture in the engine combustion chamber is ignited during, or shortly after, the injection of the ignition fuel volume.

* * * * *